Figure 1:
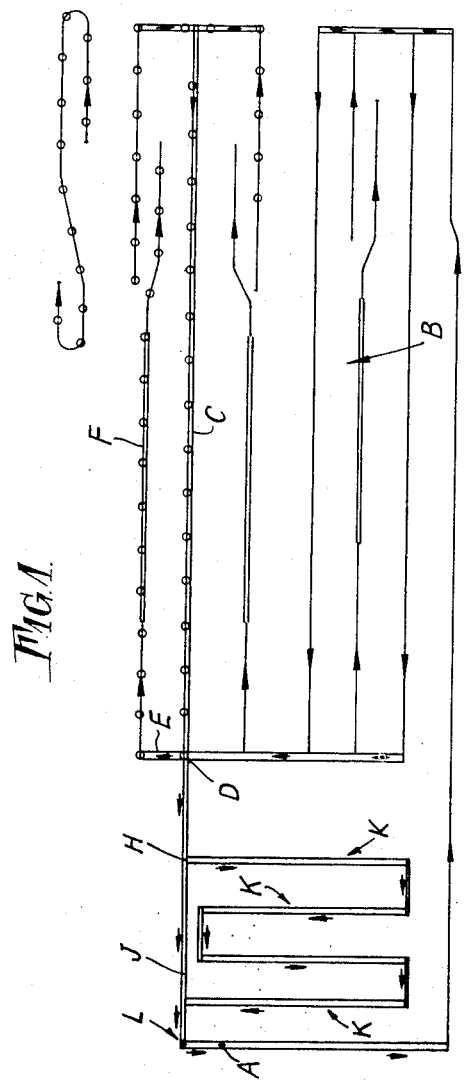

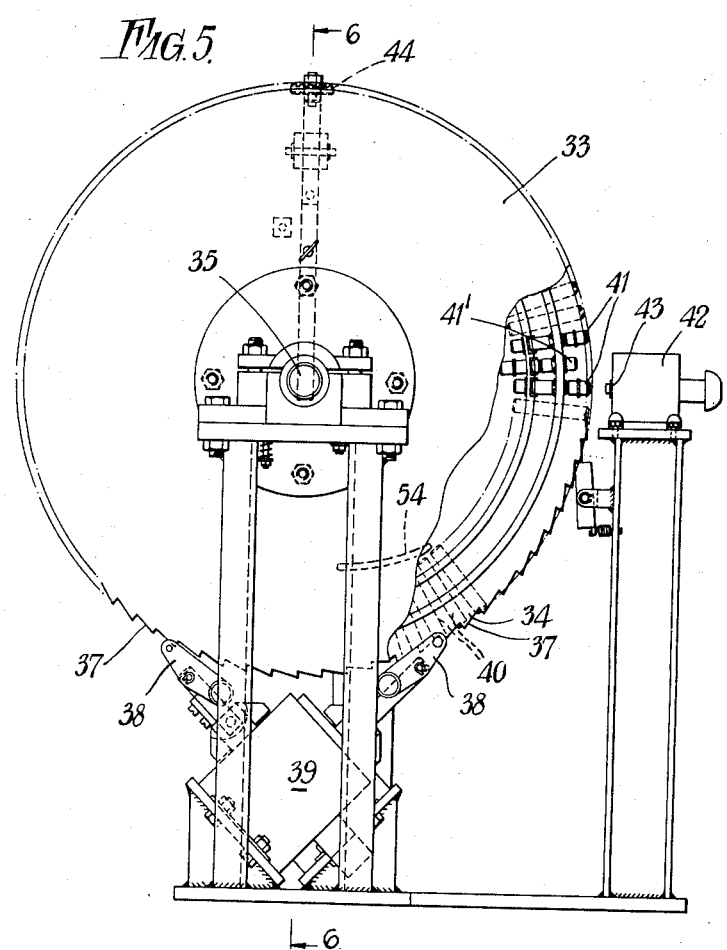

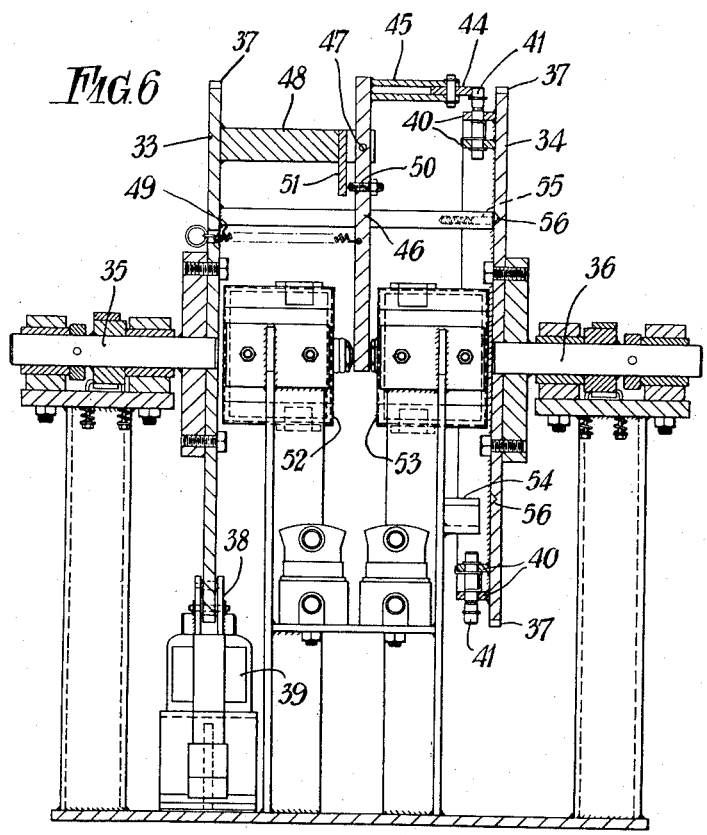

United States Patent Office 3,009,994
Patented Nov. 21, 1961

3,009,994
FLOOR CONVEYOR SYSTEMS
Arthur Thomas Charles Burrows, Stevenage, England, assignor to Geo. W. King Limited, Stevenage, England, a British company
Filed July 30, 1957, Ser. No. 675,181
Claims priority, application Great Britain July 30, 1956
13 Claims. (Cl. 200—33)

This invention relates to a floor conveyor system of the kind in which a conveyor line extends from a starting station through a processing area to an exit point, and thence through a re-sequencing area to a delivery station, alternative long and short conveyor paths being provided through the re-sequencing area to the delivery station and a loop line being extended from the exit point of the processing area back through part of said latter area to rejoin the conveyor line in front of said exit point.

With such a system it is possible to feed bodies or articles on to conveyor trucks at the starting station in a computed sequence which ensures that pre-selected bodies, which have to be diverted to the loop line for further processing, are returned to the conveyor line in correct sequential relationship to other bodies on the line so that the conveyed bodies reach the exit point in the desired final sequence for withdrawal at the delivery station. Bodies for re-processing can be marked accordingly and may be diverted to the loop line by an operator at the exit point.

It often happens, however, that processed or re-processed bodies are unsatisfactory for one reason or another on first arrival at the exit point, in the case of once processed bodies, and on the second arrival at this point, in the case of re-processed bodies, and such unsatisfactory bodies then also have to be diverted by the operator to the loop line for rectification. Since, however, the bodies requiring rectification can only be determined after processing, it is clear that the initial sequence computation cannot take account of the fact that certain bodies leaving the exit point will be out of sequence due to the necessity for rectification.

The re-sequencing area is designed to enable misplaced bodies to leave the delivery station in the correct final sequence by following the shorter path to this station, but if such re-sequencing also had to be controlled by operators, it would clearly introduce major problems of individual marking of the various trucks or bodies and provide considerable possibilities for error.

A main object of the present invention is to reduce the amount of manual control required in such a system to a minimum.

Accordingly the invention provides, for use in a conveyor system of the kind specified, the combination of an indicator mechanism which can be fitted to a truck and has at least three sequential "set" portions, the mechanism being arranged for initial handsetting at the starting station to the first or second position to indicate respectively bodies which require re-processing and single processing for the benefit of the operator at the exit point of the processing area, and being arranged for automatic re-setting in the re-processing or rectification area from the first to the second position or from the second to the third or rectification position, trip means in the rectification area which cooperate with the mechanism to effect said automatic re-setting, and a selection device in the re-sequencing area which automatically determines, in dependence upon the setting of said indicator mechanism, whether the truck is to follow the shorter or longer path in said area, the arrangement being such that all trucks fitted with the mechanism and carrying bodies which have not been rectified arrive finally at the exit point with the mechanism set to the intermediate or single processing position and are thereby automatically directed around the longer path in the re-sequencing area, whilst the mechanism on trucks carrying rectified bodies all arrive at the exit point set to the last or rectification position and are thereby directed along the shorter path.

The foregoing arrangement ensures that the trucks follow the correct paths in the re-sequencing area but does not provide for automatic withdrawal at the delivery station in the correct final sequence. To effect this further control, an automatic counting mechanism is arranged between the exit point and the delivery station for stepwise rotation by individual trucks, the mechanism having movable parts thereon which are positioned electrically according to whether a truck follows its normal path or is diverted for rectification and being arranged to control electrically the release of trucks from the short and long paths to ensure the correct final delivery sequence.

Figure 2:
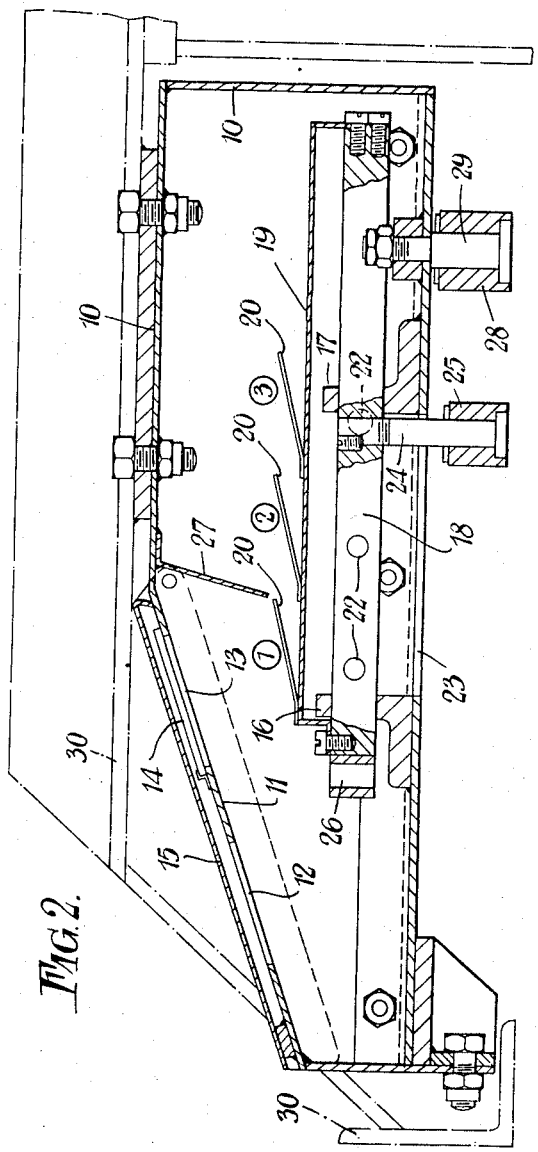
Figure 3:
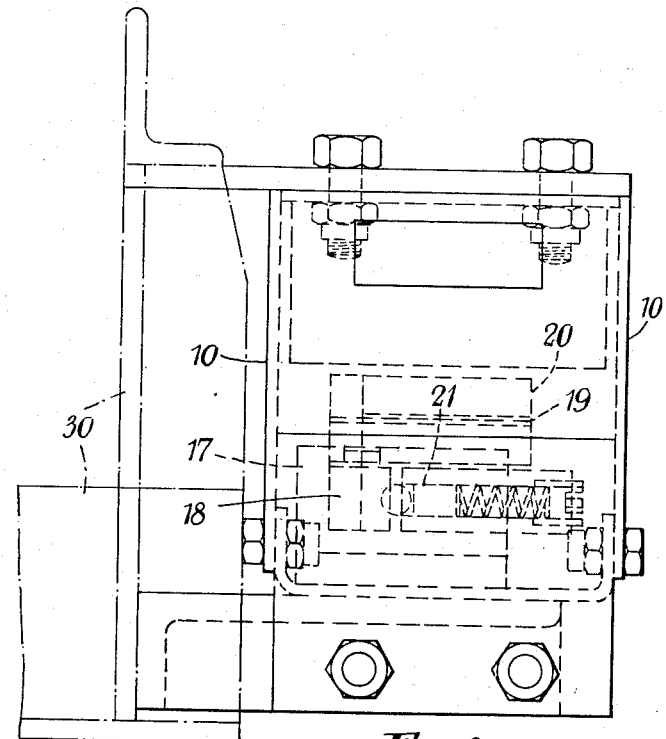
Figure 4:
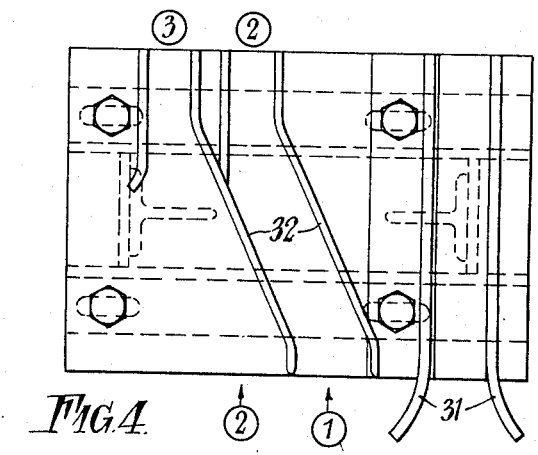

In order that the said invention may be clearly understood and readily carried into effect the same will be hereinafter more fully described with reference to the accompanying drawings in which:

FIGURE 1 is a diagrammatic plan view illustrating the layout of a conveyor system in a paint shop for car bodies, FIGURE 2 is a longitudinal sectional view of an indicator device adapted to be applied to each body carrying truck employed in the conveyor system illustrated in FIGURE 1, FIGURE 3 is an end elevational view of the device shown in FIGURE 2, FIGURE 4 is a plan view of one form of trip mechanism for effecting automatic setting of the indicator device as shown in FIGURES 2 and 3, FIGURE 5 is an elevational view of a counter device, FIGURE 6 is a section on the line 6—6 of FIGURE 5.

Referring now to the drawings there is illustrated diagrammatically in FIGURE 1 a layout of a conveyor system whereby car bodies may be conveyed through a paint shop, the arrangement being such that said bodies may be painted in monotone i.e. one colour or duotone i.e. two colours according to requirements.

The system illustrated in FIGURE 1 comprises a plurality of conveyor lines or tracks of known type along which trucks, each truck supporting a car body, travel. Such trucks are driven along said lines or tracks in known manner, for example, through the medium of endless driven chains which have upstanding pusher dogs or driving abutments adapted to engage and to impart motion to the trucks. The arrangement is such that bodies to be painted will be loaded singly one on to each truck at a loading station A and will be conveyed thence through a processing area indicated generally by B such area including various treatment booths including a monotone colour booth through which all the bodies on the trucks will be successively conveyed. The trucks leaving the area B will pass along a conveyor line C to an exit point D. At this exit point D there is provided a branch line E which communicates with a line F leading back into the processing area and through a booth in which the second colour in the case of a duotone finish is applied and in which any rectification necessary is also carried out. A track switch will be provided at D, such switch being operable by an operator stationed at that point and the arrangement is such that any truck diverted on to the lines E and F will eventually pass back on to the line C and will be conveyed again to the exit point D. From the exit point D the conveyor line passes into a re-sequencing area and at a junction H in this area such line is divided into long and short paths indicated respectively by K and J which lead eventually to a common delivery station indicated at L at which the bodies will be unloaded from the trucks which later will then pass on back to the loading station A in readiness for a further cycle of operation. Obviously, it will be necessary at L to incorporate stop means of any appropriate type known in the conveyor art, such stops of being operable to hold each truck at L while the body is removed therefrom.

On each conveyor truck which as indicated above may be of any suitable or convenient construction, there is provided an indicator mechanism which may for example be of the kind illustrated in FIGURES 2 and 3. Referring now to those figures, 10 generally designates a casing which is provided with an inclined front wall or panel 11 having apertures 12 and 13 thereon the latter being covered by a transparent sheet 14 serving as an inspection window. Hingedly mounted on the casing 10 is a flap 15 which, when in its closed position as illustrated in FIGURE 2, masks or shrouds the wall or panel 11 thereby to prevent paint or other material from fouling the inspection window 14 or entering the aperture 12 during passage of the truck through a paint spraying booth or the like. Supported for limited axial sliding movement in guides 16 and 17 fixedly mounted on the base of the casing 10 is a bar 18 on which a carrier plate 19 is mounted such plate serving to support three inclined number plates 20 respectively carrying the designations 1, 2 and 3 on their upper faces. Depending upon the position of the bar 18 one of the three number plates 20 will be brought into register with the inspection window 14. As shown in FIGURE 2 the bar 18 is so positioned that the plate 20 bearing the designation 1 is in register with the window 14. In order resiliently to retain the bar 18 in any of its three set positions a spring pressed ball 21 is provided such ball, depending upon the setting of said bar, cooperates with any one of three spaced recesses 22 present in the side of the bar. Depending from the bar 18 through a slot 23 in the base of the casing 10 is a bolt or stud 24 which serves to support at its lower end a freely rotatable striker roller 25 which cooperates with guide tracks or the like forming part of a trip mechanism located in the path of travel of the truck to which the indicator mechanism is applied so that the setting of the slide bar may be varied automatically in certain circumstances as will be hereinafter more fully explained. In addition to this provision for automatic setting the bar 18 is provided at its forward end with an aperture 26, which may be engaged by a suitable tool introduced by an operator through the aperture 12 in the front wall or panel 11 of the casing 10. Thus the bar 18 may be set by means of a manual operation by an operator to bring any one of the number plates 20 into register with the window 14. Conveniently a transverse plate 27 may be provided within the casing 10 such plate being fixedly mounted in position and being so dimensioned that its lower edge wil just clear the upper edges of the number plates 20. The plate 27 serves to mask any number plate or plates behind that actually in register with the window and thus to prevent any possibility of misreading the indicator mechanism. 28 denotes a freely rotatable guide roller which is carried by a bolt or stud 29 affixed to the base of the casing 10, said roller 28 cooperates with a second set of guide rails forming part of a trip mechanism such as is referred to above such mechanism being suitably disposed along the path of travel of the truck to which the indicator mechanism is applied. The indicator mechanism may be affixed to the underside or lower part of each truck in any convenient manner being so positioned however that when the flap 15 is raised the number plate 20 positioned in register with the window 14 will be readily visible to any operator positioned at selected points along the conveyor path. In FIGURES 2 and 3 the frame or chassis of a truck to which the indicator mechanism is applied is indicated at 30.

In FIGURE 4, the trip mechanism referred to heretofore for effecting automatic setting of an indicator mechanism such as is illustrated in FIGURES 2 and 3 is illustrated. The mechanism shown in FIGURE 4, which, will be disposed in the line E and arranged so as to lie in the path of travel of the rollers 25 and 28 of the indicator mechanism carried by each truck diverted to the line E, comprises a pair of parallel guides 31 which are mounted in a carrier plate and with which the roller 28 on the indicator mechanism cooperates and a pair of fixed parallel guides 32 with which the roller 25 carried by the slidable bar 18 cooperates. The carrier plate on which the guides 31 and 32 are mounted is so supported as to be capable of limited lateral movement. Assuming that a truck having its indicator mechanism set to position 1 (i.e. with the plate 20 bearing the designation 1 in register with the window 14) is travelling along the line E in the direction of the arrows (FIG. 4), then the roller 28 on the indicator mechanism will enter the guides 31 and will travel forwardly along a straight path while the roller 25 will enter between the fixed guides 32 and due to the disposition of said guides and to the continued movement of the truck it (the roller 25) will be forced to the left as shown and will thus move the slide bar 18 to the left thereby to bring the plate 20 bearing the designation 2 into register with the window 14. If the indicator mechanism were set in position 2 (i.e. with the plate 20 bearing the designation 2 in register with the window 14) then the roller 25 would cooperate with the left hand guide 32 and would again be deflected to the left thereby to move the slide bar 18 to the left by an amount sufficient to bring the plate 20 bearing the designation 3 into register with the window 14. Obviously by suitable arrangement of the guide tracks 32 relatively to the tracks 31 it will be possible to arrange for the slide bar 18 to be moved either to the left or to the right and into any one of its three set positions. It will be appreciated that the guide tracks 31 with which the roller 28 cooperates play no actual part in the setting operation but merely serve to guide and to prevent any tendency to undesired lateral movement of the indicator mechanism.

The three positions in which the indicator mechanism on each truck may be set will denote or indicate the following:

Position 1 (i.e. with the plate 20 bearing the designation 1 in register with the window 14) for trucks carrying bodies requiring duotone treatment.

Position 2 (i.e. with the plate 20 bearing the designation 2 in register with the window 14) for trucks carrying bodies requiring only monotone treatment.

Position 3 (i.e. with the plate 20 bearing the designation 3 in register with the window 14) for trucks carrying bodies requiring rectification.

At the starting position i.e. at the loading station A, FIGURE 1, the indicator mechanism on each truck will be set by hand either to the first or second position according to whether the body carried by the truck is to receive either duotone or monotone treatment. This setting may as indicated above readily be effected by an operator lifting the flap 15 and introducing a suitable tool through the aperture 12 and engaging such tool with the aperture 26 in the slide bar 18.

The bodies are fed in at the loading station A in a computed sequence which allows for the extra distance which has to be covered by duotone bodies so that the final sequence at the exit point D of the processing area discounting any rectification necessary, will be the correct sequence. As previously indicated all bodies pass through treatment booths including the monotone booth to arrive at the exit point D and at this point it is necessary to station an operator to divert bodies to the line E which require either monotone rectification or duotone reprocessing. The operator will by reference to the indicator mechanism on each truck be able to recognise the bodies due for duotone processing, the indicator mechanism in each such case being in the "position 1." In the case of any monotone body which requires rectification and in respect of which the indicator mechanism will be set at "position 2," this will of course be marked on the body in some convenient manner during its passage through the processing area.

As aforesaid, the bodies which are diverted by the operator at D on to the line E are thus the duotone bodies with the indicator mechanism set to "position 1" and monotone bodies requiring rectification which have their indicator mechanisms set to "position 2." The monotone bodies which are satisfactory pass from the exit point D to the resequencing area and as indicated above indicator mechanisms will have been set to "position 2" by the operator at the starting position. Disposed at a point preceding the junction H is a cam switch which is adapted to be actuated by the striker roller 25 of any indicator set to "position 2." The cam switch serves to control the operation of a track switch which is of a type well known in the conveyor art and the arrangement is such that on operation of the cam switch, the track switch will be actuated to cause any truck carrying an indicator set to "position 2" to be diverted on to the longer path K after resequencing area. The track switch will preferably be of the re-setting type so as to reset itself automatically, after each actuation, back to its initial position.

As indicated above, a trip mechanism of the type shown in FIGURE 4, is disposed in the line E, such mechanism being arranged to cooperate with the rollers 25 and 28 on each indicator mechanism passing thereover so as automatically to displace roller 25 and its associated slide bar 18 thereby to move the latter from "position 1" to "position 2" or from "position 2" to "position 3." Each truck carrying a duotone body which as indicated above will have its indicator set to "position 1" will be diverted by the operation to the line E and as a result will have its indicator mechanism set automatically from "position 1" to the monotone position which is "position 2." Monotone bodies for rectification which are diverted by the operation into the line E will have their indicator mechanisms set automatically from "position 2" to "position 3." Similarly, duotone bodies which have passed through the duotone processing stage and have travelled back along the line C to the point D will, if marked for rectification be again diverted by the operator onto the line E so that their indicator mechanisms will then automatically be changed from "position 2" to "position 3." The trucks after passing through the duotone or rectification zone i.e. after passing along the line F, re-enter the line C and pass thence to the exit point D so that trucks with satisfactory duotone as well as monotone bodies eventually arrive at D with their indicator mechanisms set to the monotone position or "position 2," whilst the trucks carrying rectified bodies whether monotone or duotone arrive with their mechanisms set to "position 3." Trucks carrying duotone bodies which have not been rectified before leaving the exit point D then, by virtue of the fact that their indicator mechanisms are set to "position 2," receive the same treatment in the re-sequencing area as the trucks carrying the non-rectified monotone bodies i.e. the rollers 25 and their indicators will be effective to operate the cam switch adjacent the junction H thereby to actuate the track switch which will cause such trucks to be diverted onto the longer path K. The trucks carrying the rectified monotone or duotone bodies will on arriving at the point D have their indicators set to "position 3" and hence when they pass into the re-sequencing area, the rollers 25 of the indicators will be displaced and will not be effective to operate the cam switch. In such a case, the track switch will not be operated and will remain in its initial position so that trucks with their indicators set to "position 3," i.e. trucks carrying rectified bodies whether monotone or duotone, will pass straight onto the shorter path J.

To ensure that trucks which have moved out of sequence due to rectification will eventually be discharged at the delivery station in the correct sequence a counting or control device is conveniently arranged near the exit point D of the processing area.

One form of such a counting or control device is illustrated in FIGURES 5 and 6 and reference will now be made to those figures from which it will be seen that the device comprises a pair of discs 33, 34 which are disposed in spaced parallel relationship and arranged for rotation about aligned axes, 35, 36 respectively each of said discs having around its periphery a ring of ratchet teeth 37 with which in each case a separate pawl element 38 operated by a solenoid 39 is adapted to cooperate. The arrangement is such that on each energisation of one or other of the solenoids 39 the pawl element 38 associated therewith will be effective to rotate the appropriate disc 33 or 34 by one step or tooth. The arrangement is also such that the solenoid 39 associated with the disc 34 will be energised to move such disc one step for each unrectified body leaving the exit point at D and moving into the re-sequencing area and also for each body to be rectified while it is moving along the line E to the rectification zone. The solenoid 39 associated with the disc 34 will be energised as the result of closure of one or the other of two cam switches $S_1$ and $S_2$ or the like of known type, the cam switch $S_1$ being located in the region of the exit point D, and the other switch $S_2$ being located adjacent the line E leading to the rectification zone. The closure of the switches $S_1$ and $S_2$ will conveniently be effected by the roller 25 on the indicator mechanism of each truck. When such mechanism is set to "position 2," the roller 25 will be effective to close the cam switch $S_1$ at the exit point D but not the cam switch $S_2$ adjacent the line E. When the indicator mechanism is set to "position 3," the roller 25 will be effective to operate the cam switch $S_2$ adjacent the line E but not the switch $S_1$ at the exit point.

Suitable means will be incorporated whereby movement of the disc 34 will result in a similar angular movement of the second disc 33 although as will be made apparent the latter is capable of movement relative to the former.

The solenoid 39 associated with the pawl element 38 controlling the operation of the disc 33 is energised only by closing of a switch $S_3$ by trucks passing out of the system at the delivery station L, and the arrangement is such that each movement of said disc 33 will be in the reverse direction to that of the disc 34 i.e. if each movement of the disc 34 is anti-clockwise then each movement of the disc 33 resultant upon actuation of its pawl element 38 will be clockwise.

The disc 34 carries at its inner face a pair of concentric rings 40 adapted to support a plurality of equally spaced radially directed pegs 41 which correspond in number to the number of steps or divisions i.e. the number of teeth 37 making up one complete revolution of said disc. It may be mentioned here that the number of pegs 41 will be appreciably larger than the number of bodies in the re-sequencing area. As will be clearly seen from FIGURE 5 each of the pegs 41 is slidably supported in the rings 40 so as to be capable of being axially displaced and of being set in either of two positions, namely:

(1) A fully projected position shown in FIGURE 5 and FIGURE 6, and (2) A depressed or retracted position indicated at 41' (FIGURE 5).

The setting of the pegs 41 is effected by a solenoid 42, hereinafter termed "the peg setting solenoid" the arrangement being such that on each indexing movement of the disc 34, a peg 41 will be brought into alignment with the plunger 43 of the peg setting solenoid 42 so that if the latter is operated then the peg will be moved into position 2 i.e. the depressed position.

The operation of the peg setting solenoid 42 is controlled by means of the cam switch $S_2$ located adjacent the line E leading to the rectification zone. The operation of this cam switch, as previously mentioned, is effected by the roller 25 on the indicator mechanism associated with each truck passing along the line E whenever the said mechanism is set to "position 3." The arrangement is such that any unrectified truck leaving the exit point D and entering the re-sequencing zone will have its indicator mechanism set to the "position 2" but while the disc 34 will be moved forwardly by one tooth or division as above described the peg setting solenoid 42 will not be operated. Also, the indicator mechanisms of trucks carrying bodies which are required to be duotone finish but are still in the monotone state, will be changed from position 1 to position 2 as they enter the line E, but as indicated above the roller 25 will not operate the cam switch $S_2$ in this line for this setting of the indicator mechanism. However, if a truck is diverted on to the line E for its body to be rectified, then the indicator mechanism will be re-set from the "position 2" to "position 3" and in that case the roller 25 incorporated in such mechanism will be effected to close the cam switch $S_2$ and to operate the peg setting solenoid 42 thereby to effect depression of the appropriate peg 41 on the disc. From the foregoing description it will be understood that in the case of a truck having the indicator mechanism set at "position 1" neither the cam switch $S_1$ at the exit point D nor the switch $S_2$ adjacent the line E will be operated. The trucks which leave the exit point D to pass onto the longer path K of the re-sequencing zone will have their indicator mechanism set at "position 2" and this will be effective with relation to the cam switch $S_1$ at the exit point D only to close the switch $S_3$ at the delivery station L.

The trucks which carry bodies requiring rectification will have their indicator mechanisms automatically re-set to "position 3" as they enter the line E leading to the rectification zone, and at this setting will be effective to close the cam switch $S_2$ adjacent said line E. Thus, unrectified bodies will be counted by means of the cam switch $S_1$ at the exit zone and rectified bodies will be counted by the cam switch $S_2$ adjacent the line E leading to the rectification zone and the fact that they are rectified will be memorised on the disc 34 by the depression of the appropriate pegs 41 through operation of solenoid 42. Arranged to cooperate with the pegs 41 on the disc 34 is a freely rotatable sensing roller 44 which is carried by a pair of arms 45 the latter being fixedly mounted at one end of a lever 46 which is pivoted mounted at 47 on a bracket 48 carried by the disc 33. The lever 46 is spring loaded by means of a spring 49 so that it will tend to move the roller in a direction towards the disc 34. 50 denotes an adjustable stop for limiting the angular movement of the lever 46, such stop cooperating with a rigid abutment 51 carried by the bracket 48. The lever 45 extends between two switches 52, 53, the arrangement being such that one or other of said switches will be operated by the lever 45 depending upon whether the roller 44 is then in contact with a projected peg 41 or has been swung to the right from the position shown in FIGURE 6 by the spring 49 due to the fact that the peg opposite thereto is depressed. 54 denotes a deflector or plough device which is fixedly mounted on a rigid frame member and is adapted to re-set any depressed pegs back into the fully projected position as such depressed pegs pass the deflector 54. In order resiliently to hold the disc 34 at each step of its movement relative to the disc 33 a spring pressed indexing peg or the like 55 is carried by a member projecting from disc 33, such peg cooperating with recesses or notches 56 on the inner surface of the disc 34.

Adjacent the end of each of the paths or lines K and J of the resequencing area is a stop which will normally be effective to prevent trucks from passing to the discharge or delivery station L. The stops employed which are adapted to be electrically operated e.g. by a solenoid, will be of any suitable type known in the conveyor art. The arrangement is such that on closure of the switch 53 resultant upon contact of the roller 44 with a projected peg 41 (which will occur in respect of each perfect or unrectified body passing into the resequencing zone) the circuit to the stop at the end of the longer path K will be closed thereby to cause withdrawal of such stop so that a perfect or unrectified body will be allowed to pass towards the discharge or delivery station L. On closure of the switch 52 on the other hand resultant upon angular movement of the lever 46 due to the fact that the roller 44 has entered a space present as a result of depression of a peg 41 (which will occur in the case of each rectified body) the circuit to the stop at the end of the shorter path J will be closed thereby to cause withdrawal of that stop so that a rectified body will be allowed to pass towards the delivery station L.

The release of trucks from the station L will be controlled by an operator and as each truck is released after unloading of a body, a switch will be operated to cause energization of the solenoid 39 and actuation of the pawl 38 cooperating with the disc 33. As explained above, the disc 33 moves with the disc 34 on each movement thereof, but on actuation of the appropriate pawl 38 due to discharge of a truck from the delivery station said disc 33 will be moved in the reverse direction. In other words if, on operation, the disc 34 moves anti-clockwise by one tooth the disc 33 will move similarly clockwise by a like amount, but on operation of the appropriate pawl 38 due to discharge of a truck from the station L the disc 33 will be moved clockwise by one tooth i.e. the disc 33 will be restored to its initial position. Thus assuming that one truck is always discharged from the discharge or delivery station L for each truck entering the resequencing zone the disc 33 after each complete operation will be in its initial position and the angular relationship between the discs 33 and 34 will remain the same. If however, more trucks are delivered to the resequencing area than are discharged from the delivery station L then the angular relationship of the discs will alter i.e. if say four trucks are delivered to the resequencing area the discs 34 and 33 will move anti-clockwise by four teeth and if only one truck is delivered from the delivery station L then the disc 33 will only move clockwise by one tooth so that it will be displaced by a distance equal to that of three teeth from its initial position. As explained, the disc 33 carries the sensing roller 44 so that in circumstances such as indicated above, the position of the roller 44 relatively to the disc 34 and the pegs 41 will be varied angularly by a distance equivalent to the three teeth. By virtue of the relative angular adjustment between the discs 33 and 34 depending upon the entry of the trucks to the resequencing area and the discharge of trucks from the delivery station L the operation of the switches 52 and 53 controlling the truck stops on the lines J and K will be appropriately controlled to ensure delivery of trucks in their correct sequence.

By virtue of the apparatus above described it will be possible to ensure that a body, which has been misplaced from its proper sequence due to rectification, will nevertheless be released from the delivery station in the correct sequence, the non-rectified bodies traveling along the longer path K of the re-sequencing area being, if necessary, held up until a rectified body is ready to be delivered at the delivery station.

I claim:

1. A control device for a conveyor system of the described character; said control device comprising two coaxially rotatable discs, actuating means for each of said discs operative to effect the step-by-step rotation of said discs in opposed directions, a series of elements carried by one of said discs and radially movable with respect to the latter between first and second positions, setting means for said elements disposed at a fixed station and operative to move the element then disposed at said station to said second position of the element, said setting means being fixed with respect to said rotatable discs and being independent thereof resetting means disposed at a fixed station which follows said fixed station of the setting means considered in the direction of the rotation of said one disc and operative to return said elements to said first position as said elements pass thereby, a sensing member carried by the other of said discs and movable by said elements between positions corresponding to said first and second position, respectively, of the elements, and control elements selectively actuated by said sensing member depending upon the position of the latter.

2. A control device as in claim 1; wherein said sensing member includes a bracket on said other disc, a lever pivotally mounted on said bracket to rock in a plane extending radially through the axis of rotation of said discs, a feeler member on the outer end of said lever engageable successively with said elements in said first position of the latter in response to relative rotation of said discs so that said elements in said first position of the latter limit the rocking of said lever in one direction, said lever being free to rock further in said one direction when said feeler encounters an element in said second position, and means yieldably urging said lever to rock further in said one direction.

3. A control device as claimed in claim 2, wherein said control elements are two switches having actuating members confronting each other at the opposite sides of the inner end of said lever so that the latter operates the actuating member of one of said switches when rocking of said lever is limited by said feeler member encountering one of said elements in said first position of the latter, and said lever operates the actuating member of the other of said switches when said lever is free to rock further in said one direction.

4. A control device for a conveyor system of the character described; said control device comprising two coaxially rotatable discs, each of said discs having ratchet teeth on the periphery thereof, actuating means for each said discs operative to effect the step-by-step rotation of each said discs in opposed directions, each said actuating means including a pawl engageable with said ratchet teeth of the related disc, electro-magnetic means for operating said pawl upon the energization thereof, a series of elements carried by one of said discs and movable with respect to the latter between first and second positions, said elements being arranged circularly on said one disc and being movable with respect to the latter between said first and second positions, each of said ratchet teeth of said one disc having a correspnding element in said series, setting means for said elements disposed at a fixed station and operative to move the element then disposed at said station to said second position of the element, resetting means disposed at a fixed station which follows said fixed station of the setting means considered in the direction of the rotation of said one disc and operative to return said elements to said first position as said elements pass thereby, a sensing member carried by the other of said discs and movable by said elements between positions corresponding to said first and second position, respectively, of the elements, said sensing member including a bracket on said other disc, a lever pivotally mounted on said bracket to rock in a plane extending radially through the axis of rotation of said discs, a feeler member on the outer end of said lever engageable successively with said elements in said first position of the latter in response to relative rotation of said discs so that said elements in said first position of the latter limit the rocking of said lever in one direction when said feeler encounters an element in said second position, means yieldably urging said lever to rock further in said one direction and control elements selectively actuated by said sensing member depending upon the position of the latter.

5. A control device as in claim 4; wherein said control elements are two switches having actuating members confronting each other at the opposite sides of the inner end of said lever so that the latter operates the actuating member of one of said switches when rocking of said lever is limited by said feeler member encountering one of said elements in said first position of the latter, and said lever operates the actuating member of the other of said switches when said lever is free to rock further in said one direction.

6. A control device as in claim 5; wherein said setting means includes a plunger movable in the radial direction with respect to said one disc, and electro-magnetic means for stroking said plunger, one of said elements being aligned with said plunger following each operation of the actuating means associated with said one disc so that, upon stroking of said plunger, the latter acts against the element then aligned therewith.

7. A control device as in claim 5; wherein said resetting means includes a fixed ramp member disposed in the path of movement of said elements which are in said second position and acting radially thereagainst in the direction for moving said elements to said first position.

8. A control device for a conveyor system of the described character; said control device comprising two coaxially rotatable discs, actuating means for each of said discs operative to effect the step-by-step rotation of said discs in opposed directions, a series of elements carried by one of said discs and movable with respect to the latter between first and second positions, setting means for said elements disposed at a fixed station and operative to move the element then disposed at said station to said second position of the element, resetting means disposed at a fixed station which follows said fixed station of the setting means considered in the direction of the rotation of said one disc and operative to return said elements to said first position as said elements pass thereby, a sensing member carried by the other of said discs and movable by said elements between positions corresponding to said first and second position, respectively, of the elements, said sensing member including a bracket on said other disc, a lever pivotally mounted on said bracket to rock in a plane extending radially through the axis of rotation of said discs, a feeler member on the outer end of said lever engageable successively with said elements in said first position of the latter in response to relative rotation of said discs so that said elements in said first position of the latter limit the rocking of said lever in one direction, said lever being free to rock further in said one direction when said feeler encounters an element in said second position, means yieldably urging said lever to rock further in said one direction and control elements selectively actuated by said sensing member depending upon the position of the latter.

9. A control device as claimed in claim 8, wherein said control elements are two switches having actuating members confronting each other at the opposite sides of the inner end of said lever so that the latter operates the actuating member of one of said switches when rocking of said lever is limited by said feeler member encountering one of said elements in said first position of the latter, and said lever operates the actuating member of the other of said switches when said lever is free to rock further in said one direction.

10. A control device as in claim 9; wherein each of said discs has ratchet teeth on the periphery thereof, and said actuating means for each of said discs includes a pawl engageable with said ratchet teeth of the related disc, and electro-magnet means for operating said pawl upon the energizing thereof.

11. A control device as claimed in claim 10, wherein said resetting means includes a fixed ramp member disposed in the path of movement of said elements which are in said second position and acting radially thereagainst in the direction for moving said elements to said first position.

12. A control device as in claim 10; wherein said elements are arranged circularly on said one disc and are movable radially with respect to the latter between said first and second positions, each of said ratchet teeth of said one disc having a corresponding element in said series.

13. A control device as claimed in claim 12, wherein said setting means includes a plunger movable in the radial direction with respect to said one disc, and electromagnetic means for stroking said plunger, one of said elements being aligned with said plunger following each operation of the actuating means associated with said one disc so that, upon stroking of said plunger, the latter acts against the element then aligned therewith.

References Cited in the file of this patent

UNITED STATES PATENTS

| | | |
|---|---|---|
| 2,020,877 | Coolidge | Nov. 12, 1935 |
| 2,194,057 | Simpson | Mar. 19, 1940 |
| 2,320,150 | Loughridge | May 25, 1943 |
| 2,527,244 | Culver | Oct. 24, 1950 |
| 2,601,154 | Krueger et al. | June 17, 1952 |
| 2,684,039 | King | July 20, 1954 |
| 2,686,415 | Griffin | Aug. 17, 1954 |
| 2,690,800 | Ross | Oct. 5, 1954 |
| 2,904,111 | Knokey | Sept. 15, 1959 |